United States Patent
Lee et al.

(10) Patent No.: US 10,264,283 B2
(45) Date of Patent: *Apr. 16, 2019

(54) METHOD AND APPARATUS FOR DECODING A VIDEO SIGNAL USING ADAPTIVE TRANSFORM

(71) Applicant: KT CORPORATION, Kyeonggi-do (KR)

(72) Inventors: Bae Keun Lee, Gyeonggi-do (KR); Jae Cheol Kwon, Daejeon (KR); Joo Young Kim, Gyeonggi-do (KR)

(73) Assignee: KT CORPORATION, Kyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/352,837

(22) PCT Filed: Oct. 18, 2012

(86) PCT No.: PCT/KR2012/008563
§ 371 (c)(1),
(2) Date: Apr. 18, 2014

(87) PCT Pub. No.: WO2013/058583
PCT Pub. Date: Apr. 25, 2013

(65) Prior Publication Data
US 2014/0247866 A1 Sep. 4, 2014

(30) Foreign Application Priority Data
Oct. 18, 2011 (KR) .................. 10-2011-0106624

(51) Int. Cl.
*H04N 19/61* (2014.01)
*H04N 19/12* (2014.01)
(Continued)

(52) U.S. Cl.
CPC ............ *H04N 19/61* (2014.11); *H04N 19/12* (2014.11); *H04N 19/122* (2014.11);
(Continued)

(58) Field of Classification Search
CPC ........... H04N 19/00078; H04N 19/157; H04N 19/18; H04N 19/194; H04N 19/12;
(Continued)

(56) References Cited

U.S. PATENT DOCUMENTS

| 7,656,949 B1 * | 2/2010 | Zhang ................. H04N 19/122 375/240.02 |
| 8,488,668 B2 | 7/2013 | Ye et al. |

(Continued)

FOREIGN PATENT DOCUMENTS

| CN | 101252686 A | 8/2008 |
| CN | 101426141 A | 5/2009 |

(Continued)

OTHER PUBLICATIONS

"Transform skip mode" to Marta Mrak.*
(Continued)

*Primary Examiner* — Mohammed Jebari
(74) *Attorney, Agent, or Firm* — IP Legal Services, LLC

(57) ABSTRACT

The present invention relates to a technique for encoding and decoding an image, and a method for encoding the image, according to the present invention, comprises the steps of: performing a prediction with respect to a current block; and transforming a residual which is generated by the prediction, wherein in the step of transforming, a first transform is performed on the residual, and then a second transform is performed on a lower frequency area, and wherein a mode of the second transform can be decided on the basis of a mode of the first transform.

6 Claims, 7 Drawing Sheets

(51) Int. Cl.
*H04N 19/625* (2014.01)
*H04N 19/44* (2014.01)
*H04N 19/176* (2014.01)
*H04N 19/122* (2014.01)
*H04N 19/157* (2014.01)
*H04N 19/18* (2014.01)
*H04N 19/194* (2014.01)
*H04N 19/513* (2014.01)
*H04N 19/124* (2014.01)
*H04N 19/147* (2014.01)

(52) U.S. Cl.
CPC ......... *H04N 19/124* (2014.11); *H04N 19/157* (2014.11); *H04N 19/176* (2014.11); *H04N 19/18* (2014.11); *H04N 19/194* (2014.11); *H04N 19/44* (2014.11); *H04N 19/45* (2014.11); *H04N 19/513* (2014.11); *H04N 19/625* (2014.11); *H04N 19/147* (2014.11)

(58) Field of Classification Search
CPC .... H04N 19/122; H04N 19/61; H04N 19/176; H04N 19/147
See application file for complete search history.

(56) References Cited

U.S. PATENT DOCUMENTS

| | | |
|---|---|---|
| 8,885,714 B2 | 11/2014 | Budagavi et al. |
| 2004/0151253 A1 | 8/2004 | Bossen |
| 2006/0013506 A1* | 1/2006 | Song et al. ............ 382/309 |
| 2006/0104521 A1 | 5/2006 | Teng |
| 2006/0291556 A1* | 12/2006 | Watanabe ........... H04N 19/176 375/240.03 |
| 2008/0137758 A1 | 6/2008 | Bossen |
| 2008/0279466 A1* | 11/2008 | Yang ................ H04N 19/176 382/246 |
| 2008/0310504 A1 | 12/2008 | Ye et al. |
| 2009/0110070 A1 | 4/2009 | Takahashi et al. |
| 2009/0190659 A1 | 7/2009 | Lee et al. |
| 2009/0238271 A1 | 9/2009 | Kim et al. |
| 2010/0046640 A1* | 2/2010 | Shin .................. H04N 19/105 375/240.29 |
| 2010/0061454 A1 | 3/2010 | Park et al. |
| 2010/0309974 A1* | 12/2010 | Reznik .............. G06F 17/147 375/240.2 |
| 2010/0312811 A1* | 12/2010 | Reznik .............. G06F 17/147 708/402 |
| 2011/0032990 A1 | 2/2011 | Choi et al. |
| 2011/0090954 A1* | 4/2011 | Cohen .............. H04N 19/197 375/240.03 |
| 2011/0170594 A1 | 7/2011 | Budagavi et al. |
| 2011/0182362 A1* | 7/2011 | Kim ................. H04N 19/124 375/240.16 |
| 2011/0182523 A1 | 7/2011 | Kim et al. |
| 2011/0200112 A1* | 8/2011 | Won .................. H04N 19/52 375/240.16 |
| 2011/0268188 A1* | 11/2011 | Kim et al. ............. 375/240.12 |
| 2012/0008683 A1* | 1/2012 | Karczewicz ......... H04N 19/159 375/240.12 |
| 2012/0008690 A1* | 1/2012 | Lee et al. ............ 375/240.16 |
| 2012/0057630 A1 | 3/2012 | Saxena et al. |
| 2012/0099646 A1 | 4/2012 | Coban et al. |
| 2012/0163469 A1 | 6/2012 | Kim et al. |
| 2012/0189055 A1 | 7/2012 | Chien et al. |
| 2012/0195379 A1 | 8/2012 | Alshin et al. |
| 2012/0230392 A1 | 9/2012 | Zheng et al. |
| 2012/0301040 A1 | 11/2012 | Yie et al. |
| 2012/0320980 A1 | 12/2012 | Shimada et al. |
| 2012/0320984 A1 | 12/2012 | Zhou |
| 2012/0328013 A1 | 12/2012 | Budagavi et al. |
| 2013/0034154 A1* | 2/2013 | Song et al. ............. 375/240.03 |
| 2013/0051461 A1* | 2/2013 | Chiu .................... H04N 19/129 375/240.12 |
| 2013/0051475 A1* | 2/2013 | Joshi et al. ............ 375/240.18 |
| 2013/0058410 A1* | 3/2013 | Yasugi et al. ........... 375/240.12 |
| 2013/0064301 A1 | 3/2013 | Guo et al. |
| 2013/0083853 A1 | 4/2013 | Coban et al. |
| 2013/0089144 A1* | 4/2013 | Lee ........................ 375/240.12 |
| 2013/0114717 A1 | 5/2013 | Zheng et al. |
| 2013/0114730 A1 | 5/2013 | Joshi et al. |
| 2013/0128972 A1 | 5/2013 | Yamaguchi et al. |
| 2013/0156335 A1 | 6/2013 | Lim et al. |
| 2013/0170553 A1 | 7/2013 | Chen et al. |
| 2013/0177079 A1 | 7/2013 | Kim et al. |
| 2013/0230103 A1* | 9/2013 | Lim et al. ............... 375/240.12 |
| 2013/0251044 A1 | 9/2013 | Lim et al. |
| 2013/0301736 A1 | 11/2013 | Sugio et al. |
| 2013/0343448 A1* | 12/2013 | He et al. ............... 375/240.03 |
| 2013/0343464 A1* | 12/2013 | Van der Auwera ........... H04N 19/00775 375/240.18 |
| 2014/0056362 A1 | 2/2014 | Mrak et al. |
| 2014/0092956 A1* | 4/2014 | Panusopone ......... H04N 19/119 375/240.02 |
| 2014/0140408 A1 | 5/2014 | Lee et al. |
| 2014/0198848 A1 | 7/2014 | Yie et al. |
| 2014/0321543 A1 | 10/2014 | Kim et al. |
| 2015/0043631 A1 | 2/2015 | Yie et al. |
| 2015/0043632 A1 | 2/2015 | Yie et al. |
| 2015/0043640 A1 | 2/2015 | Yie et al. |
| 2015/0043643 A1 | 2/2015 | Yie et al. |
| 2015/0249840 A1 | 9/2015 | Kim et al. |
| 2015/0358618 A1 | 12/2015 | Kim et al. |

FOREIGN PATENT DOCUMENTS

| | | |
|---|---|---|
| CN | 101867813 A | 10/2010 |
| EP | 2086239 A2 | 8/2009 |
| EP | 2154898 A2 | 2/2010 |
| EP | 2753081 A2 | 7/2014 |
| EP | 2777260 A1 | 9/2014 |
| GB | 2492333 A | 1/2013 |
| JP | 2003-143551 A | 5/2003 |
| JP | 2009-224854 A | 10/2009 |
| KR | 10-2011-0014839 A | 2/2011 |
| KR | 10-2011-0116025 A | 10/2011 |
| RU | 2419246 C1 | 5/2011 |
| WO | 2008/035842 A1 | 3/2008 |
| WO | 2010/038951 A2 | 4/2010 |
| WO | 2011/016678 A2 | 2/2011 |

OTHER PUBLICATIONS

Marta Mrak et al., "Transform skip mode", JCTVC-F077_r1, Joint Collaborative Team on Video Coding (JCT-VC) of ITU-T SG16 WP3 and ISO/IEC JTC1/SC29/WG11 6th Meeting: Torino, IT, Jul. 14-22, 2011.

* cited by examiner

METHOD AND APPARATUS FOR DECODING A VIDEO SIGNAL USING ADAPTIVE TRANSFORM

CROSS REFERENCE TO RELATED APPLICATIONS

This application is a National Stage Patent Application of PCT International Patent Application No. PCT/KR2012/008563 (filed on Oct. 18, 2012) under 35 U.S.C. § 371, which claims priority to Korean Patent Application No. 10-2011-0106624 (filed on Oct. 18, 2011), the teachings of which are incorporated herein in their entireties by reference.

TECHNICAL FIELD

The present invention relates to video encoding and decoding, and more particularly, to a method and an apparatus for transforming a signal in video encoding and decoding.

BACKGROUND ART

Recently, demands for high-resolution and high-quality videos, such as high-definition (HD) and ultrahigh-definition (UHD) videos, have increased in various fields of applications.

As video data has higher resolution and higher quality, the amount of data more increases relative to existing video data. Accordingly, when video data is transferred using media such as existing wired and wireless broad band lines or is stored in existing storage media, transfer cost and storage cost increase.

In order to solve these problems occurring with an increase in resolution and quality of video data, high-efficiency video compression techniques may be utilized.

Video compression technology include various techniques, such as an inter prediction technique of predicting pixel values included in a current picture from previous or subsequent pictures of the current picture, an intra prediction technique of predicting pixel values included in a current picture using pixel information in the current picture, a technique of transforming pixel information into a frequency domain by a predetermined unit and quantizing a transform coefficient, and an entropy encoding technique of assigning a short code to a value with a high appearance frequency and assigning a long code to a value with a low appearance frequency.

Video data may be effectively compressed and transferred or stored using such video compression techniques.

DISCLOSURE

Technical Problem

An aspect of the present invention is to provide a method and an apparatus for efficiently transforming video information.

Another aspect of the present invention is to provide a method and an apparatus for performing first transform according to a prediction method and performing second transform on a low-frequency domain according to the first transform to improve efficiency in compression.

Still another aspect of the present invention is to provide a method and an apparatus for performing first transform according to a shape of a partition and performing second transform on a low-frequency domain according to the first transform to improve efficiency in compression.

Technical Solution

An embodiment of the present invention provides a video encoding method including performing prediction for a current block, and transforming a residual generated by the prediction, wherein, in the transforming step, second transform is performed on a low-frequency domain after performing first transform on the residual, and determines a mode of the second transform based on a mode of the first transform.

In the performing step, intra prediction may be performed for the current block, and the mode of the first transform may be determined as one of 2-directional (2D) transform, 1-directional (1D) vertical transform, 1D horizontal transform and non-transform based on a direction of a prediction mode of the intra prediction. Here, the mode of the second transform may be the same as the mode of the first transform.

In the performing step, inter prediction may be performed for the current block, and the mode of the first transform may be determined as one of 2D transform, 1D vertical transform, 1D horizontal transform and non-transform based on a shape of the current block. Here, the mode of the second transform may be the same as the mode of the first transform.

In the transforming step, the mode of the first transform may be determined based on rate-distortion optimization. Here, information indicating the determined mode of the first transform may be transmitted.

The second transform may be discrete sine transform (DST) by a 4×4 block.

Another embodiment of the present invention provides a video decoding method including performing inverse transform to generate a residual block for a current block, and performing prediction to generate a predicted block for the current block, wherein, in the performing inverse transform, second inverse transform on a low-frequency domain may be performed after performing first inverse transform on encoded residual information for the current block, and a mode of the second transform may be determined based on a mode of the first transform.

In the performing prediction, intra prediction may be performed for the current block, and the mode of the first inverse transform may be determined as one of 2D transform, 1D vertical transform, 1D horizontal transform and non-transform based on a direction of a prediction mode of the intra prediction. Here, the mode of the second inverse transform may be the same as the mode of the first inverse transform.

In the performing prediction, inter prediction may be performed for the current block, and the mode of the inverse first transform is determined as one of 2D transform, 1D vertical transform, 1D horizontal transform and non-transform based on a shape of the current block. Here, the mode of the second inverse transform may be the same as the mode of the first inverse transform.

In the performing the inverse transform, the first inverse transform may be performed according to a mode indicated by received information, and the received information indicates one of 2D transform, 1D vertical transform, 1D horizontal transform and non-transform as the mode of the first inverse transform. Here, the mode of the second inverse transform may be the same as the mode of the first inverse transform.

The second transform may be DST by a 4×4 block.

Still another embodiment of the present invention provides a video encoding apparatus including a prediction module to perform prediction for a current block, and a transform module to transform a residual generated by the prediction, wherein the transform module performs second transform on a low-frequency domain after performing first transform on the residual and determines a mode of the second transform based on a mode of the first transform.

Yet another embodiment of the present invention provides a video decoding method including an inverse transform module to generate a residual block for a current block by performing inverse transform, and a prediction module to generate a predicted block for the current block, wherein the inverse transform module performs second inverse transform on a low-frequency domain after performing first inverse transform on encoded residual information for the current block, and determines a mode of the second transform based on a mode of the first transform.

Advantageous Effects

According to the present invention, residual information may be efficiently transformed and inverse-transformed.

According to the present invention, first transform may be performed according to a prediction method and second transform may be performed on a low-frequency domain according to the first transform, thereby improving efficiency in compression and transmission.

According to the present invention, first transform may be performed according to a partitioned shape and second transform may be performed on a low-frequency domain according to the first transform, thereby improving efficiency in compression and transmission.

MODE FOR INVENTION

Figure 1:
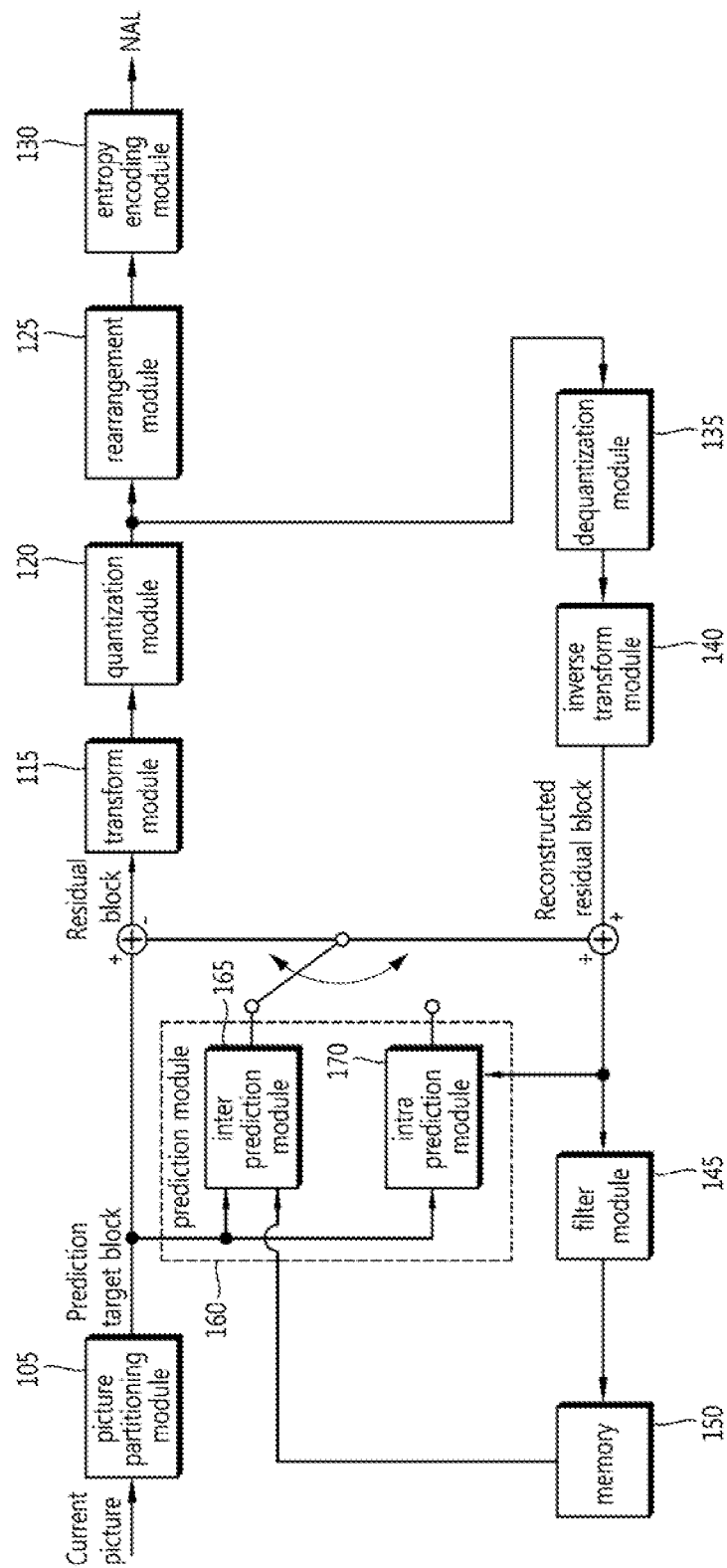
FIG. 1 is a block diagram illustrating a video encoding apparatus according to an exemplary embodiment of the present invention.

The present invention may be changed and modified variously and be illustrated with reference to different exemplary embodiments, some of which will be described and shown in the drawings. However, these embodiments are not intended for limiting the invention but are construed as including includes all modifications, equivalents and replacements which belong to the spirit and technical scope of the invention. Like reference numerals in the drawings refer to like elements throughout.

Although the terms first, second, etc. may be used to describe various elements, these elements should not be limited by these terms. These terms are used only to distinguish one element from another element. For example, a first element could be termed a second element and a second element could be termed a first element likewise without departing from the teachings of the present invention. The term "and/or" includes any and all combinations of a plurality of associated listed items.

It will be understood that when an element is referred to as being "connected to" or "coupled to" another element, the element can be directly connected or coupled to another element or intervening elements. On the contrary, when an element is referred to as being "directly connected to" or "directly coupled to" another element, there are no intervening elements present.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "include" and/or "have," when used in this specification, specify the presence of stated features, integers, steps, operations, elements, and/or components, but do not preclude the presence or addition of one or more other features, integers, steps, operations, elements, components, and/or groups thereof.

Hereinafter, exemplary embodiments of the invention will be described in detail with reference to the accompanying drawings. Like reference numerals in the drawings refer to like elements throughout, and redundant descriptions of like elements will be omitted herein.

FIG. 1 is a block diagram illustrating a video encoding apparatus according to an exemplary embodiment of the present invention.

Referring to FIG. 1, the video encoding apparatus 100 includes a picture partitioning module 105, a prediction module 110, a transform module 115, a quantization module 120, a rearrangement module 125, an entropy encoding module 130, a dequantization module 135, an inverse transform module 140, a filter module 145 and a memory 150.

Although elements illustrated in FIG. 1 are independently shown so as to represent different distinctive functions in the video encoding apparatus, such a configuration does not indicate that each element is constructed by a separate hardware constituent or software constituent. That is, the elements are independently arranged for convenience of description, wherein at least two elements may be combined into a single element, or a single element may be divided into a plurality of elements to perform functions. It is to be noted that embodiments in which some elements are integrated into one combined element and/or an element is divided into multiple separate elements are included in the scope of the present invention without departing from the essence of the present invention.

Some elements may not be essential to the substantial functions in the invention and may be optional constituents for merely improving performance. The invention may be embodied by including only constituents essential to embodiment of the invention, except for constituents used to merely improve performance. The structure including only the essential constituents except for the optical constituents used to merely improve performance belongs to the scope of the invention.

The picture partitioning module 105 may partition an input picture into at least one process unit. Here, the process unit may be a prediction unit (PU), a transform unit (TU) or a coding unit (CU). The picture partitioning module 105 may partition one picture into a plurality of combinations of coding units, prediction units and transform units and select one combination of coding units, prediction units and transform units on the basis of a predetermined criterion (for example, a cost function), thereby encoding the picture.

For example, one picture may be partitioned into a plurality of coding units. A recursive tree structure such as a quad tree structure may be used to partition a picture into coding units. Being a picture or a coding unit of a maximum size as root, a coding unit may be partitioned into sub-coding units with as many child nodes as the partitioned coding units. A coding unit which is not partitioned any more in accordance with a predetermined constraint is to be a leaf node. That is, assuming that a coding unit may be partitioned into quadrates only, a single coding unit may be partitioned into at most four different coding units.

In the embodiments of the invention, a coding unit may be used to refer to not only a unit of encoding but also a unit of decoding.

A prediction unit may be partitioned into at least one square or rectangular form with the same size in a coding unit or be partitioned such that a shape of partitioned prediction unit is different from a shape of other prediction unit in a coding unit.

When a prediction unit to be subjected to intra prediction is generated based on a coding unit and the coding unit is not a minimum coding unit, intra prediction may be performed without partitioning the coding unit into plural prediction units (N×N).

The prediction module 110 may include an inter prediction module to perform inter prediction and an intra prediction module to perform intra prediction. The prediction module may determine which of inter prediction or intra prediction should be performed on a prediction unit, and may determine specific information (for example, intra prediction mode, motion vector, and reference picture, etc) according to the determined prediction method. Here, a process unit on which prediction is performed may be different from a process unit for which a prediction method and specific information are determined. For example, a prediction method and a prediction mode may be determined for each prediction unit, while prediction may be performed for each transform unit. A residual value (residual block) between a generated predicted block and an original block may be input to the transform module 115. Further, prediction mode information, motion vector information and the like used for prediction may be encoded along with the residual value by the entropy encoding module 130 and be transmitted to the decoding apparatus. When a specific encoding mode is used, the original block may be encoded and transmitted to the decoding apparatus without generating a predicted block through the prediction module 110.

The inter prediction module may predict for a prediction unit on the basis of information on at least one picture among a previous picture and a subsequent picture of a current picture. The inter prediction module may include a reference picture interpolation module, a motion prediction module, and a motion compensation module.

The reference picture interpolation module may be supplied with reference picture information from the memory 150 and generate pixel information less than an integer pixel position unit (an integer pixel unit or a pixel unit) from a reference picture. In the case of luma pixels, a DCT-based 8-tap interpolation filter having a varying filter coefficient may be used to generate pixel information less than an integer pixel unit in a unit of ¼ pixel position (a unit of ¼ pixel). In the case of chroma pixels, a DCT-based 4-tap interpolation filter having a varying filter coefficient may be used to generate pixel information less than an integer pixel unit in a unit of ⅛ pixel.

The motion prediction module may perform motion prediction on the basis of the reference picture interpolated by the reference picture interpolation module. Various methods, such as a full search-based block matching algorithm (FBMA), a three-step search (TSS) algorithm and a new three-step search (NTS) algorithm, may be used to calculate a motion vector. A motion vector has a motion vector value in a unit of ½ or ¼ pixel on the basis of an interpolated pixel. The motion prediction module may perform a prediction on a current prediction unit using different motion prediction methods. Various methods, such as skipping, merging, and advanced motion vector prediction (AMVP) etc, may be used as the motion prediction method.

The intra prediction module may generate a prediction block based on information of reference pixel neighboring to a current block which is pixel information in a current picture. When a block neighboring to a current prediction unit is a block having been subjected to inter prediction and a reference pixel is a pixel having been subjected to inter prediction, reference pixel information included in the block having been subjected to inter prediction may be substituted with a reference pixel information in a block having been subjected to intra prediction. That is, when a reference pixel is not available, information on the unavailable reference pixel may be substituted with at least one reference pixel of the available reference pixels.

A prediction mode of intra prediction includes a directional prediction mode in which information on a reference pixel is used according to a prediction direction and a non-directional prediction mode in which direction information is not used in performing prediction. A mode for predicting luma information and a mode for predicting chroma information may be different from each other. Intra prediction mode information used to obtain luma information or predicted luma signal information may be used to predict chroma information.

When a prediction unit and a transform unit have the same size in performing intra prediction, intra prediction on the prediction unit may be performed based on left pixels, an upper-left pixel and upper pixels of the prediction unit. On the other hand, when a prediction unit and a transform unit have different sizes in performing intra prediction, intra prediction may be performed using reference pixels based on the transform unit. Intra prediction with N×N partitioning may be performed only for a minimum coding unit.

In the intra prediction method, an adaptive intra smoothing (AIS) filter may be applied to reference pixels according to the prediction mode prior to generation of a predicted block. Different types of AIS filters may be applied to the reference pixels. In the intra prediction method, the intra prediction mode of a current prediction unit may be predicted from an intra prediction mode of a prediction unit located neighboring to the current prediction unit. In predicting for the prediction mode of the current prediction unit using mode information predicted from a neighboring prediction unit, when the current prediction unit and the neighboring prediction unit have the same intra prediction mode, information indicating that the current prediction unit and the neighboring prediction unit have the same prediction mode may be transmitted using predetermined flag information. If the current prediction unit and the neighboring prediction unit have different prediction modes, information on the prediction mode of the current block may be encoded by entropy encoding.

A residual block including residual information which is on a difference between the predicted block and the original block of the prediction unit may be generated based on the prediction unit by the prediction module 110. The generated residual block may be input to the transform module 115.

The transform module 115 may transform the residual block including the residual information of the prediction unit generated based on the original block by the prediction module 110 using a transform method such as Discrete Cosine Transform (DCT) or Discrete Sine Transform (DST). A transform method to be used to transform the residual block may be determined among DCT and DST on the basis of the intra prediction mode information of the prediction unit used to generate the residual block.

The quantization module 120 may quantize values transformed into a frequency domain by the transform module 115. A quantization parameter may change depending on a block or importance of a picture. Values output from the quantization module 120 may be provided to the dequantization module 135 and the rearrangement module 125.

For the quantized residual values, the rearrangement module 125 may rearrange coefficients.

The rearrangement module 125 may change a two-dimensional (2D) block of coefficients into a one-dimensional (1D) vector of coefficients through coefficient scanning. For example, the rearrangement module 125 may change a 2D block of coefficients into a 1D vector of coefficients using upright scanning. Vertical scanning of a 2D block of coefficients in a column direction and horizontal scanning of a 2D block of coefficients in a row direction may be used depending on a size of a transform unit and an intra prediction mode, instead of upright scanning. That is, a scanning method for use may be selected based on the size of the transform unit and the intra prediction mode among upright scanning, vertical scanning, and horizontal scanning.

The entropy encoding module 130 may perform entropy encoding on the basis of the values obtained by the rearrangement module 125. Various encoding methods, such as exponential Golomb coding, context-adaptive variable length coding (CAVLC), and context-adaptive binary arithmetic coding (CABAC), may be used for entropy encoding.

The entropy encoding module 130 may encode a variety of information, such as residual coefficient information and block type information on a coding unit, prediction mode information, partitioning unit information, prediction unit information, transfer unit information, motion vector information, reference frame information, block interpolation information and filtering information which may be obtained from the rearrangement module 125 and the prediction module 110.

The entropy encoding module 130 may entropy-encode coefficients of a coding unit input from the rearrangement module 125.

The dequantization module 135 and the inverse transform module 140 dequantize the values quantized by the quantization module 120 and inversely transform the values transformed by the transform module 115. The residual generated by the dequantization module 135 and the inverse transform module 140 may be added to the predicted block, which is predicted by the motion vector prediction module, the motion compensation module, and the intra prediction module of the prediction module 110, thereby generating a reconstructed block.

The filter module 145 may include at least one of a deblocking filter, an offset correction module, and an adaptive loop filter (ALF).

The deblocking filter 145 may remove block distortion generated at boundaries between blocks in a reconstructed picture. Whether to apply the deblocking filter to a current block may be determined on the basis of pixels included in several rows or columns of the block. When the deblocking filter is applied to a block, a strong filter or a weak filter may be applied depending on a required deblocking filtering strength. In addition, when horizontal filtering and vertical filtering are performed in applying the deblocking filter, the horizontal filtering and vertical filtering may be performed in parallel.

The offset correction module may correct an offset of the deblocking filtered picture from the original picture by a pixel. A method of partitioning pixels of a picture into a predetermined number of regions, determining a region to be subjected to offset correction, and applying offset correction to the determined region or a method of applying offset correction in consideration of edge information on each pixel may be used to perform offset correction on a specific picture.

The ALF may perform filtering based on a comparison result of the filtered reconstructed picture and the original picture. Pixels included in a picture may be partitioned into predetermined groups, a filter to be applied to each group may be determined, and differential filtering may be performed for each group. Information on whether to apply the ALF may be transferred by each coding unit (CU) and a shape and coefficient of an ALF to be applied to each block may vary. The ALF may have various types and a number of coefficients included in a corresponding filter may vary. Further, an ALF filter with the same form (fixed form) may be applied to a block regardless of characteristics of the block.

The memory 150 may store a reconstructed block or picture output from the filter module 145, and the stored reconstructed block or picture may be provided to the prediction module 110 when performing inter prediction.

Figure 2:
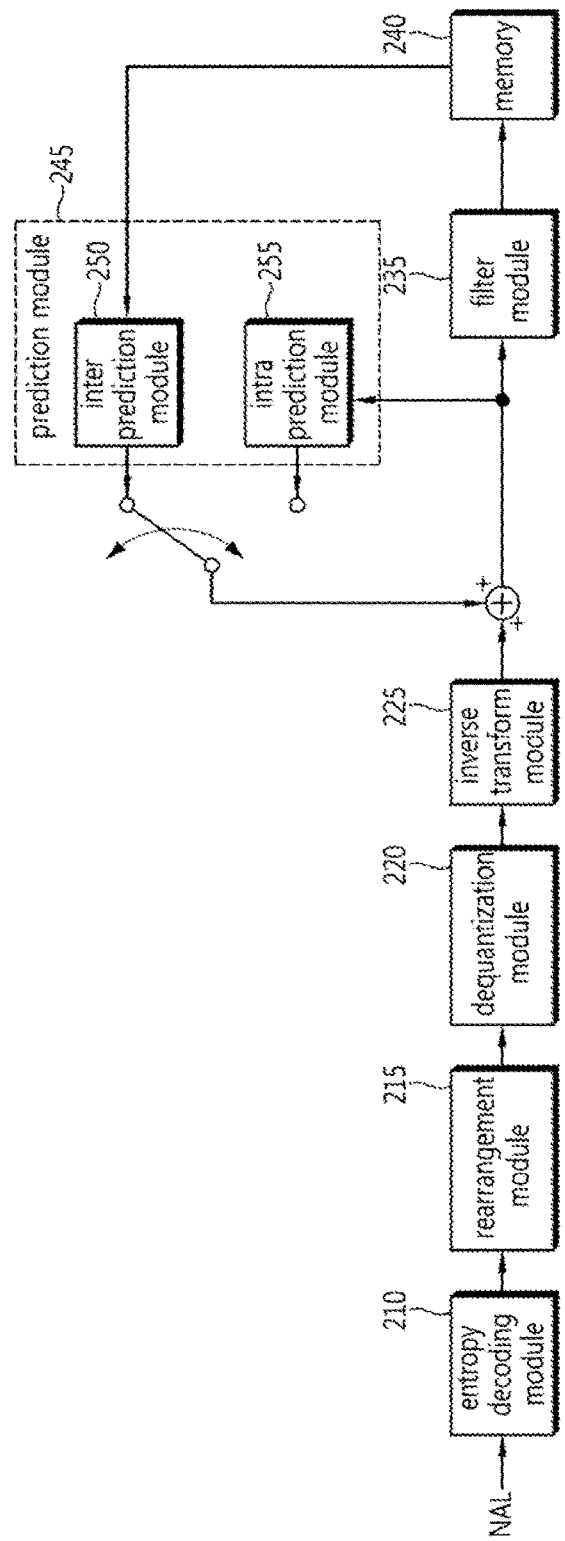
FIG. 2 is a block diagram illustrating a video decoding apparatus according to an exemplary embodiment of the present invention.

FIG. 2 is a block diagram illustrating a video decoding apparatus according an exemplary embodiment of the present invention.

Referring to FIG. 2, the video decoding apparatus 200 may include an entropy decoding module 210, a rearrangement module 215, a dequantization module 220, an inverse transform module 225, a prediction module 230, a filter module 235, and a memory 240.

When a video bitstream is input from the video encoding apparatus, the input bitstream may be decoded according to an inverse process of the video encoding process by the video encoding apparatus.

The entropy decoding module 210 may perform entropy decoding according to an inverse process of the entropy encoding process by the entropy encoding module of the video encoding apparatus. For example, various methods, such as exponential Golomb coding, CAVLC and CABAC, may be used for entropy decoding, corresponding to the method used by the video encoding apparatus.

The entropy decoding module 210 may decode information associated with intra prediction and inter prediction performed by the encoding apparatus.

The rearrangement module 215 may perform rearrangement on the bitstream entropy-decoded by the entropy decoding module 210 on the basis of the rearrangement method of the encoding module. The rearrangement module 215 may reconstruct and rearrange coefficients expressed in a 1D vector form into coefficients in a 2D block. The rearrangement module 215 may be provided with information associated with coefficient scanning performed by the encoding module and may perform rearrangement using a method of inversely scanning the coefficients on the basis of scanning order by which scanning is performed by the encoding module.

The dequantization module 220 may perform dequantization on the basis of a quantization parameter provided from the encoding apparatus and the rearranged coefficients of the block.

The inverse transform module 225 may perform inverse DCT and inverse DST with respect to DCT and DST performed by the transform module, where the DCT and DST have been performed on the result of quantization by the video encoding apparatus. Inverse transform may be performed on the basis of a transform unit determined by the video encoding apparatus. The transform module of the video encoding apparatus may selectively perform DCT and DST depending on a plurality of information elements, such as a prediction method, a size of the current block and a prediction direction, etc, and the inverse transform module 225 of the video decoding apparatus may perform inverse transform on the basis of information on the transform performed by the transform module of the video encoding apparatus.

The prediction module 230 may generate a predicted block on the basis of predicted block generation information provided from the entropy decoding module 210 and information on a previously-decoded block or picture provided from the memory 240.

Similarly to the operation of the video encoding apparatus as described above, when a prediction unit and a transform unit have the same size in performing intra prediction, intra prediction on the prediction unit is performed based on left pixels, an upper-left pixel and upper pixels of the prediction unit. On the other hand, when a prediction unit and a transform unit have different sizes in performing intra prediction, intra prediction may be performed using reference pixels based on the transform unit. Intra prediction with N×N partitioning may be performed only for a minimum coding unit.

The prediction module 230 includes a prediction unit determination module, an inter prediction module and an intra prediction module. The prediction unit determination module may receive a variety of information, such as prediction unit information input from the entropy decoding module, prediction mode information of an intra prediction method and motion prediction-related information on an inter prediction method. And the prediction unit determination module may determine a prediction unit in a current coding unit, and may determine which of the inter prediction and the intra prediction is performed on the prediction unit. The inter prediction module may perform inter prediction on a current prediction unit based on information of at least one picture among a previous picture and a subsequent picture of a current picture including the current prediction unit using information necessary for inter prediction for the current prediction unit provided from the video encoding apparatus.

In order to perform inter prediction, it may be determined on the basis of a coding unit whether a motion prediction method for a prediction unit included in the coding unit is a skip mode, a merge mode or an AMVP mode.

The intra prediction module may generate a predicted block on the basis of pixel information in a current picture. When a prediction unit is a prediction unit on which intra prediction is performed, intra prediction may be performed based on intra prediction mode information on the prediction unit provided from the video encoding apparatus. The intra prediction module may include an AIS filter, a reference pixel interpolation module, and a DC filter. The AIS filter performs filtering on reference pixels of a current block, and whether to apply the AIS filter may be determined depending on a prediction mode for the current prediction unit. AIS filtering may be performed on the reference pixels of the current block using the prediction mode for the prediction unit and information on the AIS filter provided from the video encoding apparatus. When the prediction mode for the current block is a mode not involving AIS filtering, the AIS filter may not be applied.

When the prediction mode for the prediction unit is a prediction mode of performing intra prediction on the basis of pixel values obtained by interpolating the reference pixels, the reference pixel interpolation module may generate reference pixels in a pixel unit of less than an integer position unit by interpolating the reference pixels. When the prediction mode for the current prediction unit is a prediction mode of generating a predicted block without interpolating the reference pixels, the reference pixels may not be interpolated. The DC filter may generate a predicted block through filtering when the prediction mode for the current block is the DC mode.

The reconstructed block or picture may be provided to the filter module 235. The filter module 235 may include a deblocking filter, an offset correction module, or an ALF.

Information on whether the deblocking filter is applied to a corresponding block or picture and information on which of a strong filter and a weak filter is applied when the deblocking filter is used may be provided from the video encoding apparatus. The deblocking filter of the video decoding apparatus may be provided with information on the deblocking filtering from the video encoding apparatus and may perform deblocking filtering on a corresponding block.

The offset correction module may perform offset correction on the reconstructed picture based on an offset correction type and offset value information applied to the picture in the encoding process.

The ALF may be applied to a coding unit on the basis of information on whether the ALF is applied or not, and ALF coefficient information provided from the encoding apparatus. The ALF information may be included and provided in a specific parameter set.

The memory 240 may store the reconstructed picture or block for use as a reference picture or a reference block, and may provide the reconstructed picture to an output module.

As described above, in the embodiments of the invention, the term "coding unit" is used as an encoding unit and may be also used as a unit of decoding (decoding unit).

As illustrated in FIGS. 1 and 2, the transform modules of the encoding apparatus and the decoding apparatus may perform block-based transform, such as DST or DCT, on a residual block (transform block).

Here, if the residual block is generated based on a predicted block generated by intra prediction, transform may be determined according to a prediction mode.

Figure 3:
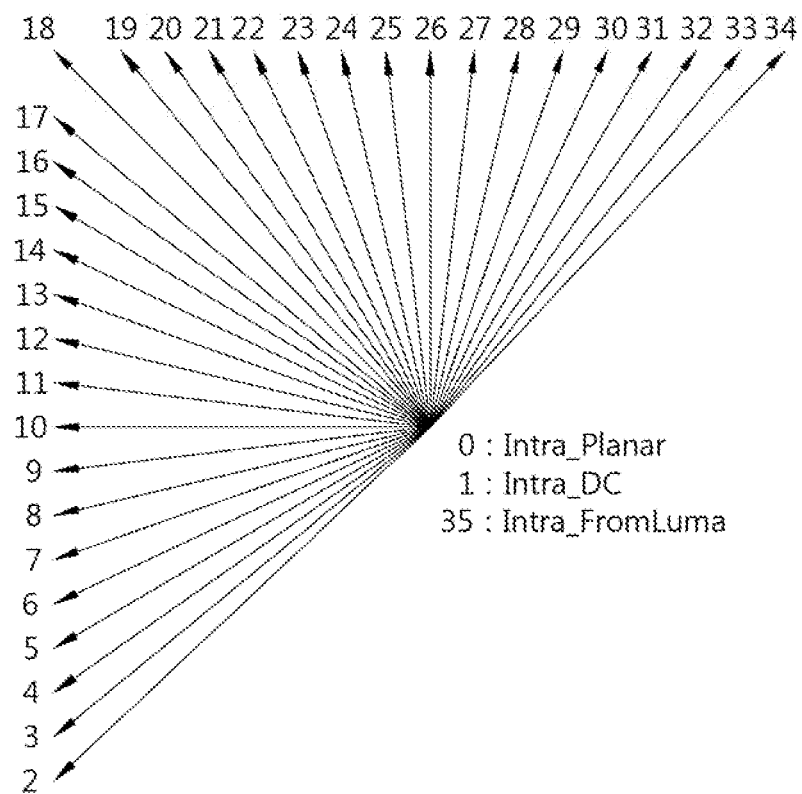
FIG. 3 schematically illustrates a prediction mode used for intra prediction.

FIG. 3 schematically illustrates a prediction mode used for intra prediction. Referring to FIG. 3, intra prediction is carried out using two non-directional prediction modes and 32 directional prediction modes.

The encoding apparatus and the decoding apparatus may perform intra prediction on a current block using a prediction mode selected among the two non-directional prediction modes, a planar mode and a DC mode, and the 32 directional prediction modes corresponding to directions shown in FIG. 3.

When a directional intra prediction mode is used, the encoding apparatus and the decoding apparatus may perform prediction on the current block to generate a predicted block based on samples located in a corresponding direction among neighboring samples to the current block.

Thus, as described above, the encoding apparatus and the decoding apparatus may determine a transform method based on a prediction mode used to generate a predicted block.

Meanwhile, when a sparse signal is included or when horizontal and vertical signals have different characteristics, vertical transform or horizontal transform may be skipped or both transforms may be skipped for a signal, thereby reducing complexity of processing in the decoding apparatus and improving coding efficiency.

For the encoding apparatus, a transform skip mode (TSM) is a method for enhancing encoding efficiency by performing all 2-dimensional (2D) transforms, skipping vertical transform or horizontal transform, or skipping both horizontal and vertical transforms.

Among transform skip modes, TS0 is a mode of performing 2D transform on a transform block. TS1 is a mode of performing transform on rows only in a transform block (transform on rows), and TS2 is a mode of performing transform on columns only in a transform block (transform on columns). TS3 is a mode of performing neither transform on rows (horizontal transform) nor transform on columns (vertical transform).

For the decoding apparatus, a transform skip mode is a method of performing all 2D inverse transforms, skipping vertical inverse transform or horizontal inverse transform, or skipping both horizontal and vertical inverse transforms.

For example, in a decoding process, among transform skip modes, TS0 is a mode of performing 2D inverse transform on a transform block. TS1 is a mode of performing inverse transform on rows only in a transform block (inverse transform on rows), and TS2 is a mode of performing inverse transform on columns only in a transform block (inverse transform on columns). TS3 is a mode of performing neither inverse transform on rows (horizontal inverse transform) nor inverse transform on columns (vertical inverse transform).

Figure 4:
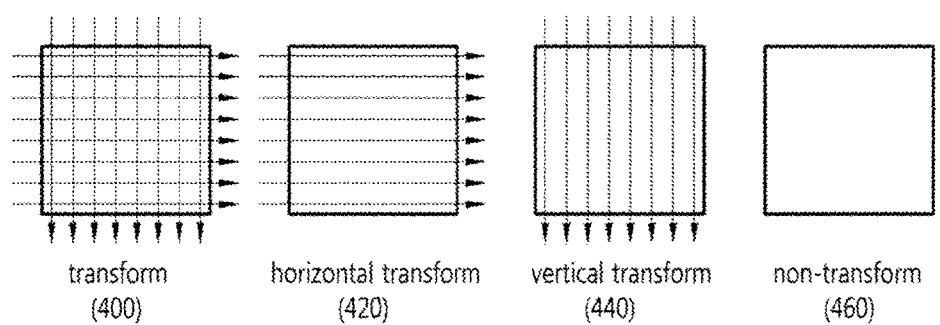
FIG. 4 schematically illustrates a transform skip mode (TMS).

FIG. 4 schematically illustrates a transform skip mode.

When TS0 400 is employed in the encoding apparatus, 2D transform is applied to on a transform block. Here, when TS0 400 is employed, horizontal transform may be performed before vertical transform or vertical transform may be performed before horizontal transform. When TS1 420 is employed, horizontal transform is performed on a transform block. When TS2 440 is employed, vertical transform is performed on a transform block. When TS3 460 is employed, neither horizontal transform nor vertical transform is performed on a transform block.

When TS0 400 is employed in the decoding apparatus, 2D inverse transform is applied to on a transform block. Here, when TS0 400 is employed, horizontal inverse transform may be performed before vertical inverse transform or vertical inverse transform may be performed before horizontal inverse transform. When TS1 420 is employed, horizontal inverse transform is performed on a transform block. When TS2 440 is employed, vertical inverse transform is performed on a transform block. When TS3 460 is employed, neither horizontal inverse transform nor vertical inverse transform is performed on a transform block.

Table 1 illustrates a codeword allocated to each mode in transform skip modes.

TABLE 1

| TSM | Transform on rows | Transform on columns | Codeword | Note |
|---|---|---|---|---|
| TS0 | ○ | ○ | 1 | 2D transform |
| TS1 | ○ | — | 01 | 1D transform |
| TS2 | — | ○ | 001 | 1D transform |
| TS3 | — | — | 000 | Non-transform |

When transform skip mode is applied, scaling may be carried out without changing or modifying a quantization matrix.

Equation 1 illustrates an example of scaling to be performed by the encoding apparatus and decoding apparatus.

$$Y=(X\text{-scale+offset})>>\text{shift} \quad \text{[Equation 1]}$$

In Equation 1, x is a scaling target parameter, and y is a scaled parameter value. A shift operation factor (shift) may be adaptively determined in the encoding apparatus or be determined in advance.

A scaling coefficient (scale) is dependent on a TU size and may be determined based on a TU size. Table 2 illustrates a scaling coefficient according to block (for example, TU) size.

TABLE 2

| | N | | | |
|---|---|---|---|---|
| | 4 | 8 | 16 | 32 |
| Scale | 128 | 181 | 256 | 362 |

Referring to Table 2, a scaling coefficient may be determined according to a block size (N×N), for example, a scaling coefficient for a 4×4 block is 128, a scaling coefficient for a 8×8 block is 181, a scaling coefficient for a 16×16 block is 256, and a scaling coefficient for a 32×32 block is 362.

Although a transform skip mode is applied based on an intra prediction mode in the foregoing description, the present invention is not limited thereto but transform skip mode may be also applied in inter prediction.

A transform skip mode may be applied based on an intra prediction mode used when intra prediction is applied, while a transform skip mode may be applied based on a block shape when inter prediction is applied.

Block shapes to which inter prediction may be applied are a 2N×2N square block, a minimum size block of N×N, and asymmetric blocks of 2N×N, N×2N, 2N×nU, 2N×nD, nL×2N and nR×2N, and a transform skip mode may be applied based on a block shape.

Table 3 illustrates transform skip modes applicable in inter prediction.

TABLE 3

| TSM | Transform on rows | Transform on columns | Codeword | Note |
|---|---|---|---|---|
| TS0 | ○ | ○ | 1 | 2D transform |
| TS1 | ○ | — | 01 | 1D transform |
| TS2 | — | ○ | 001 | 1D transform |
| TS3 | — | — | 000 | Non-transform |

Meanwhile, after a transform block is transformed, another transform may be applied to a low-frequency domain, which is referred to, for convenience, as second transform. For example, after transform is applied, DST may be applied to a low frequency domain by each 4×4 block to enhance efficiency.

The applied DST as second transform may be 2D DST, horizontal DST, or vertical DST according to the intra prediction modes illustrated in FIG. 3. Table 4 illustrates DST types applicable according to the intra prediction modes.

TABLE 4

| | IntraPredMode | | | | | | | | | | | | | | | | | |
|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 |
| horizTrType | 0 | 1 | 0 | 1 | 1 | 0 | 0 | 1 | 1 | 1 | 1 | 1 | 0 | 0 | 1 | 1 | 1 | 1 |
| vertTrType | 1 | 0 | 0 | 1 | 1 | 1 | 1 | 1 | 0 | 0 | 1 | 1 | 1 | 1 | 1 | 1 | 0 | 0 |
| | IntraPredMode | | | | | | | | | | | | | | | | | |
| | 18 | 19 | 20 | 21 | 22 | 23 | 24 | 25 | 26 | 27 | 28 | 29 | 30 | 31 | 32 | 33 | 34 | |
| horizTrType | 1 | 1 | 1 | 1 | 0 | 0 | 0 | 0 | 1 | 1 | 1 | 1 | 1 | 1 | 1 | 1 | 1 | |
| vertTrType | 1 | 1 | 1 | 1 | 1 | 1 | 1 | 1 | 1 | 1 | 1 | 1 | 0 | 0 | 0 | 0 | 1 | |

Referring to Table 4, it is determined whether to perform horizontal DST (horizTrType=1) or vertical DST (vertTrType=1) based on an intra prediction mode.

Although Table 4 illustrates that whether to perform horizontal DST or vertical DST is determined based on an intra prediction mode, both vertical DST and horizontal DST may be applied by 4×4 blocks regardless of intra prediction modes.

Meanwhile, when a transform skip mode is applied, how to apply second transform may be an issue. Here, the second transform may be performed based on an applied transform skip mode.

For example, DST in the second transform may be performed as the same transform method as in a transform skip mode. Here, as an example of the same transform method as employed in the transform skip mode (TSM), a transform direction may be considered. Specifically, when the 2D transform mode TS0 is applied as a transform skip mode, 2D DST may be employed as second transform. When horizontal transform TS1 is applied as a transform skip mode, horizontal DST may be employed as second transform. When vertical transform TS2 is applied as a transform skip mode, vertical DST may be employed as second transform. When TS3 is applied, that is, when neither horizontal transform nor vertical transform is applied, second transform may not be applied.

Table 5 illustrates a second transform type (mode) according to a TSM.

| | TSM | TS0 | TS1 | TS2 | TS3 |
|---|---|---|---|---|---|
| Second transform | horizTrType = 1 | 1 | 1 | 0 | 0 |
| | vertTrType = 1 | 1 | 0 | 1 | 0 |

Although the second transform in intra prediction has been illustrated, the present invention is not limited thereto but second transform may be applied in the same manner in inter prediction. For example, when inter prediction has been performed, the second transform may be also applied based on a transform skip mode applied to a corresponding block. Specifically, when the 2D transform mode TS0 is applied as a transform skip mode, 2D DST may be employed as second transform. When horizontal transform TS1 is applied as a transform skip mode, horizontal DST may be employed as second transform. When vertical transform TS2 is applied as a transform skip mode, vertical DST may be employed as second transform. When TS3 is applied, that is, when neither horizontal transform nor vertical transform is applied, second transform may not be applied.

Figure 5:
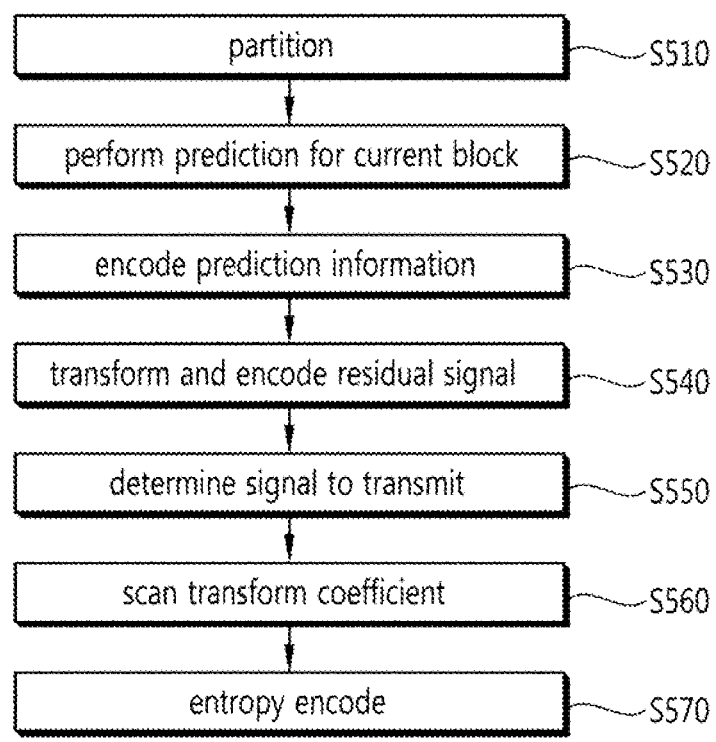
FIG. 5 is a flowchart schematically illustrating an encoding process adopting a transform skip mode and second transform according to the present invention.

FIG. 5 is a flowchart schematically illustrating an encoding process adopting a transform skip mode and second transform according to the present invention.

Referring to FIG. 5, the encoding apparatus may partition an input picture (S510). The input picture may be partitioned into blocks, such as CUs, PUs and TUs.

The encoding apparatus may perform prediction for a processing target block that is a current block (S520). The encoding apparatus may perform inter prediction or intra prediction for the current block to generate a predicted block and generate a residual block based on the predicted block.

The encoding apparatus may encode prediction information (S530). The encoding apparatus may encode motion information when inter prediction is applied and encode information indicating an intra prediction mode when intra prediction is applied.

The encoding apparatus may transform a residual signal and encode the transformed residual signal (S540). The encoding apparatus may apply a transform skip mode to the residual signal and perform second transform based on the transform skip mode.

The encoding apparatus may determine information to transmit (S550). The encoding apparatus may determine through rate-distortion optimization (RDO) which to transmit among the residual block and transform coefficients.

To transmit the transform coefficients, the encoding apparatus may scan the transform coefficients (S560). The transform coefficients are rearranged by scanning.

The encoding apparatus may entropy-encode the scanned transform coefficients (S570). The encoding apparatus may transmit the entropy-encoded transform coefficients as a bitstream.

Hereinafter, the encoding process illustrated in FIG. 5 is described in detail.

The encoding apparatus may partition the input picture (S510). The input picture is partitioned for encoding. For example, a current picture or frame may be partitioned into coding units (CUs).

One inter coding unit CU may include a plurality of inter prediction units PUs and have a plurality of prediction modes PreMode. For instance, the plurality of prediction modes may include a skip mode MODE_SKIP and an inter mode MODE_INTER. In the skip mode, prediction may be performed for a block having a partition mode Part Mode of PART_2N×2N, without partitioning into smaller Prediction units PUs. Thus, prediction is performed using motion information on a neighboring block as motion information allocated to a PART_2N×2N prediction unit PU, and a residual signal is not transmitted.

In the inter mode, a coding unit may include four types of prediction unit partitions, for example, PART_2N×2N, PART_2N×N, PART_N×2N and PART_N×N. In this case, the encoding apparatus may signal that the prediction mode PreMode is the inter mode MODE_INTER and information Part Mode indicating which is a partition type among the four types to the decoding apparatus.

When a coding unit is partitioned into a plurality of prediction units, prediction may be performed for a prediction unit to be currently encoded (current block).

The encoding apparatus may perform prediction for the prediction target block that is the current block (S520).

When inter prediction is performed for the current block or current prediction unit, the encoding apparatus may perform motion prediction for the current block using previous pictures. Or When inter prediction is performed for the current block or current prediction unit, the encoding apparatus may perform motion prediction for the current block using frames; or previous and subsequent pictures; or frames. Motion information including a motion vector and a reference picture list, etc. may be obtained through motion prediction. When intra prediction is performed for the current block, the encoding apparatus may perform intra prediction for the current block using samples neighboring to the current block and derive an intra prediction mode.

Information on the current prediction unit is not transmitted as it is but a differential value from a predicted value obtained from neighboring blocks may be transmitted so as to improve compression efficiency. Here, in the skip mode, prediction is performed using motion information on neighboring block as the motion information on the current block but the differential value is not transmitted.

In the merge mode and the AMVP mode, prediction is perform using motion information on neighboring block and a differential value (residual signal) is transmitted.

Figure 6:
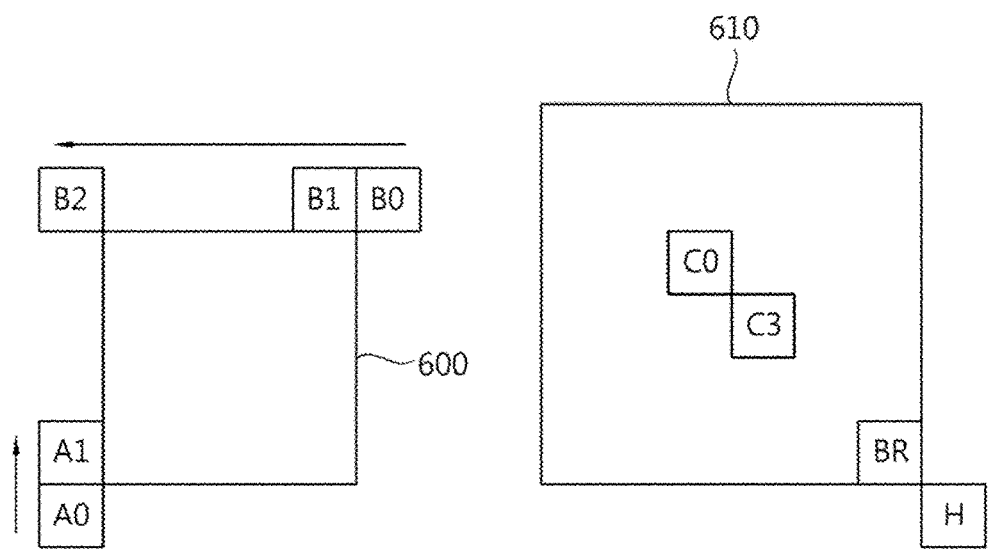
FIG. 6 schematically illustrates information on a neighboring block available in a skip mode, a merge mode, and an AMVP mode.

FIG. 6 schematically illustrates information on a neighboring block available in the skip mode, the merge mode, and the AMVP mode.

To obtain a predicted motion value of a current block 600, the encoding apparatus may construct a merging candidate list and an AMVP candidate list. The candidate lists may be constructed based on spatial candidate blocks A0, A1, B0, B1 and B2 neighboring to the current block 600 and a corresponding block in a collocated picture 610 as a temporal candidate block. Here, the temporal candidate block may be any one of C0, C3, BR and H. On the merging candidate list, candidates A (A0→A1), B (B0→B1→B2) and the temporal candidate block may be considered in order. On the AMVP candidate list, candidates may be considered with the same order as for the merging candidate list or the candidates may be considered in order of the temporal candidate block, A (A0→A1) and B (B0→B1→B2).

The encoding apparatus may perform prediction for the current block using motion information on the candidate blocks.

When the merge mode is applied, the encoding apparatus derives merging candidates from motion information on blocks temporally and spatially neighboring to the current block (for example, a prediction unit). If a candidate having the same motion information as the current block is present among the candidates, the encoding apparatus transmits a flag indicating that the merge mode is used and an index of the candidate having the same motion information as the current block. For example, in the merge mode, (i) the encoding apparatus may derive an available temporal motion vector prediction value using a derived reference picture index (refIdxLX, X=0 or 1). (ii) The encoding apparatus may make a merging candidate list (MergeCandList). (iii) When a candidate block having the same motion information as the current block is present, the encoding apparatus sets a merge flag (Merge_flag) equal to 1 and encodes an index (Merge_Idx) for the candidate block.

In the AMVP mode, the encoding apparatus derives AMVP candidates from motion information on blocks temporally and spatially neighboring the current block (for example, a PU). (i) The encoding apparatus derives spatial motion vector predictor (MVP) candidates from the neighboring blocks (for example, Pus) to the current block. The neighboring blocks shown in FIG. 6 may be used to derive the spatial motion vector candidates. (ii) The encoding apparatus derives a temporal motion vector candidate of a collocated block using a reference picture index (RefIdxLX) obtained in a motion estimation process. (iii) The encoding apparatus makes an MVP list (mvpListLX). Here, motion vectors may have priories in order of ① a motion vector of a temporal collocated block (mvLXCol), for example, the collocated block may be one of the corresponding blocks C0, C3, BR and H of FIG. 6, ② motion vectors of neighboring blocks in the left side of the current block (mvLXA) and ③ motion vectors of neighboring blocks in the upper side of the current block (mvLXB), among available motion vectors. Here, the available blocks, such as the collocated block, the neighboring blocks in the left side of the current block and the neighboring blocks in the upper side of the current block, are illustrated above in FIG. 6. (iv) When a plurality of motion vectors has the same value, the encoding apparatus removes motion vectors other than a motion vector having a highest priority among the motion vectors having the same value from the MVP list. (v) The encoding apparatus set an optimal MVP among the motion vector candidates on the MVP list (mvListLX) as an MVP for the current block. The optimal MVP is a MVP of a candidate block minimizing a cost function.

Meanwhile, when the intra prediction mode is applied, the encoding apparatus performs prediction using samples neighboring to the current block. The encoding apparatus may determine an optimal intra prediction mode using RDO. In the DC mode or planar mode, the encoding apparatus may generate a predicted block for the current block using a pixel value derived based on an average pixel value of neighboring samples or pixels values of neighboring samples regardless of neighboring samples' direction. When a directional mode is employed, the encoding apparatus may generate a predicted block for the current block using sample in direction indicated by an intra prediction mode for the current block.

The encoding apparatus may encode the prediction information (S530).

In the merge mode, when a candidate having the same motion information as the current block (for example, a PU) among merging candidates, the encoding apparatus indicates that the current block is in the merge mode and transmits a merge flag indicating that the merge mode is used and a merge index (Merge_Idx) indicating which candidate is selected among the merging candidates. The encoding apparatus obtains a differential signal (residual signal) between the current block and a block predicted by the merge mode after motion compensation. When there is no residual signal to transmit, the encoding apparatus may transmit information indicating that a merge skip mode is applied.

In the AMVP mode, the encoding apparatus determines a candidate minimizing a cost function among AMVP candidates by comparing motion vector information of the AMVP candidates and motion vector information of the block to be currently encoded. The encoding apparatus obtain a differential value in motion information between the current block and the candidate minimizing the cost function, and a residual signal by motion compensation using the AMVP candidate. The encoding apparatus entropy-encodes a motion vector difference between a motion vector of the current block (for example, prediction unit) and the motion vector of the candidate (optimal predictor) minimizing the cost function.

When intra prediction is applied, the encoding apparatus derives a residual signal as a difference between the current block and the predicted block generated using the intra prediction mode. The encoding apparatus may entropy-encode the residual signal. The encoding apparatus may also encode information indicating that the intra prediction mode is applied.

As described above, the encoding apparatus may transform and encode the residual signal generated through prediction (S540). The encoding apparatus may derive the residual signal by obtaining a difference between a pixel value of the current block and a pixel value of the predicted block with a pixel as a unit.

The encoding apparatus may transform and encode the generated residual signal. Here, available transforming and encoding kernels may be 2×2, 4×4, 8×8, 16×16, 32×32 and 64×64 block, among which a predetermined encoding kernel may be determined in advance as a kernel to be used for transform.

When intra prediction is applied, the encoding apparatus may determine a transform skip mode based on a direction of an intra prediction mode. Although the foregoing description illustrates that a transform skip mode is determined according to a direction of an intra prediction mode, the encoding apparatus may determine a transform skip mode based on RDO and may signal information on the determined transform skip mode. Here, number of transform skip mode candidates may be determined differently according to directions of intra prediction modes. Further, information indicating transform skip modes may be encoded with different codewords based on directions of intra prediction modes.

When inter prediction is applied, the encoding apparatus may determine a transform skip mode based on a shape of the current block (for example, prediction unit). Although the foregoing description illustrates that a transform skip mode is determined based on a shape of the current block, the encoding apparatus may determine a transform skip mode based on RDO and may signal information on the determined transform skip mode. Here, number of transform skip mode candidates may be determined differently based on shapes of the current block. Further, information indicating transform skip mode s may be encoded with different codewords based on shapes of the current block.

The encoding apparatus may perform 2D transform, 1D transform (transform on columns and transform on rows) or transform bypassing according to a transform skip mode.

Meanwhile, the same transform skip mode as for a luma component may be applied to a chroma component.

After a transform skip mode is applied, the encoding apparatus may perform second transform based on the applied transform skip mode. A second transform may be performed by applying DST to each 4×4 block. The encoding apparatus determines a type of the second transform based on the transform skip mode and applies the determined type of second transform to a low-frequency domain. For example, the encoding apparatus may perform DST on a low-frequency domain with a 4×4 block size.

As a type of the second transform methods determined according to transform skip mode s, as described above, 2D DST is applied as second transform when the 2D transform mode TS0 is applied as a transform skip mode; horizontal DST is employed as second transform when horizontal transform TS1 is applied as a transform skip mode; vertical DST is applied as second transform when vertical transform TS2 is applied as transform skip mode; and second transform may not be applied when TS3 is applied, that is, when neither horizontal transform nor vertical transform is applied.

Meanwhile, a transform coefficient C for an n×n block may be determined by Equation 2.

$$C(n,n)=T(n,n) \times B(n,n) \times T(n,n)T \qquad \text{[Equation 2]}$$

In Equation 2, T is a transform matrix, and B is a residual block.

The encoding apparatus quantizes transform coefficients.

The encoding apparatus may determine the information to transmit (S550). The encoding apparatus may determine which to transmit among the residual signal and transform coefficients through rate-distortion optimization (RDO). If the residual signal is small as prediction is properly done, the encoding apparatus may transmit the residual signal as it is. Alternatively, the encoding apparatus may transmit information which minimizes cost by comparing costs before and after transform and encoding. When the information to transmit is determined, the encoding apparatus may signal a type of the determined information, that is, whether the determined information is the residual signal or transform coefficients.

To transmit the transform coefficients, the encoding apparatus may scan the transform coefficients (S560). The transform coefficients are rearranged by scanning.

The encoding apparatus may entropy-encode the scanned transform coefficients (S570). The encoding apparatus may transmit the entropy-encoded transform coefficients as a bitstream.

Figure 7:
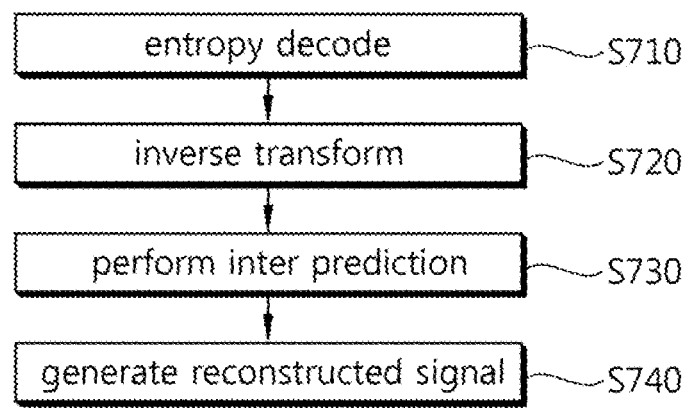
FIG. 7 is a flowchart schematically illustrating a decoding process adopting a transform skip mode and second transform according to the present invention.

FIG. 7 is a flowchart schematically illustrating a decoding process adopting a transform skip mode and second transform according to the present invention.

Referring to FIG. 7, the decoding apparatus entropy-decodes a bitstream received from the encoding apparatus (S710). The decoding apparatus may perform entropy decoding using a corresponding method to entropy encoding used by the encoding apparatus.

The decoding apparatus may inverse-transform the entropy decoded information (S720). The decoding apparatus may scan inversely the entropy decoded information to generate a two-dimensional block.

The decoding apparatus performs prediction for a current block (for example, a PU) (S730). The decoding apparatus may generate a predicted block for the current block according to a prediction method used for the encoding apparatus.

The decoding apparatus may generate a reconstructed signal for the current block (S740). The decoding apparatus may add the predicted block and a residual block to reconstruct the current block.

Hereinafter, the decoding process illustrated in FIG. 7 is described in detail.

First, the decoding apparatus entropy-decodes the bitstream received from the encoding apparatus (S710). The decoding apparatus may obtain, from the received bitstream, a block type of the current block and information on a prediction mode for the current block. For example, when variable length coding (VLC) is applied to the current block in entropy encoding, the block type may be obtained from a VLC table.

The decoding apparatus may find out through an information type whether the transmitted information on the current block is a residual signals or transform coefficients. The decoding apparatus may obtain information on the residual signal or transform coefficient of the current block.

The decoding apparatus may inverse-transform the entropy decoded information (S720). The decoding apparatus may scan inversely the entropy decoded residual signal or transform coefficient to generate a two-dimensional block.

When intra prediction is applied to the current block, the decoding apparatus may derive a transform skip mode based on an intra prediction mode and perform inverse transform according to the derived transform skip mode. When a transform skip mode is determined regardless of an intra prediction mode (for example, determined based on RDO), the decoding apparatus may decode information, received from the encoding apparatus, indicating a transform skip mode and perform inverse transform process according to the transform skip mode.

When inter prediction is applied to the current block, the decoding apparatus may derive a transform skip mode based on a shape of the current block (for example, prediction unit) and perform inverse transform according to the derived transform skip mode. When a transform skip mode is determined regardless of a shape of the current block (for example, determined based on RDO), the decoding apparatus may decode information, received from the encoding apparatus, indicating a transform skip mode and perform inverse transform according to the received from the encoding apparatus.

The same information as used for a luma component may be reused to determine transform skip mode for a chroma component.

After a transform skip mode is applied, the decoding apparatus may perform second inverse transform based on the transform skip mode applied to the current block. Second inverse transform may be performed by applying inverse DST to each 4×4 block. The decoding apparatus determines a type of second inverse transform method based on the transform skip mode and applies the determined type of second inverse transform to a low-frequency domain. For example, the decoding apparatus may perform inverse DST on a low-frequency domain with a 4×4 block size.

As a type of second inverse transform determined according to transform skip modes, inverse 2D DST is applied as second inverse transform when inverse 2D transform TS0 is applied as a transform skip mode; inverse horizontal DST is applied as second inverse transform when inverse horizontal transform TS1 is applied as transform skip mode; inverse vertical DST is applied as second inverse transform when inverse vertical transform TS2 is applied as transform skip mode; and second inverse transform may not be applied when TS3 is applied as transform skip mode, that is, when neither inverse horizontal transform nor inverse vertical transform is applied.

When the transmitted signal is the residual signal, the decoding apparatus may generate a residual block based on the residual signal.

When the transmitted signal is the transform coefficient, the decoding apparatus may generate a transform coefficient block based on the transform coefficient. The decoding apparatus may dequantize and inverse-transform the transform coefficient block to derive the residual block.

Equation 3 illustrates an example of inverse transform applied to the current transform coefficient block.

$$B(n,n)=T(n,n) \times C(n,n) \times T(n,n)^T \qquad [\text{Equation 3}]$$

In Equation 3, each factor is the same as described above in Equation 2.

The decoding apparatus performs prediction for the current block (for example, prediction unit) (S730).

Even though the information transmitted from the encoding apparatus indicates that the prediction mode is the skip mode (PredMode=MODE_SKIP), the decoding apparatus may obtain a motion vector (mvLX) and a reference picture index through the merge mode when a merge flag has a value of 1.

The decoding apparatus may derive merging candidates from blocks (for example, prediction units) neighboring to the current block (for example, prediction unit). Further, the decoding apparatus may derive the reference picture index (refIdxLX) so as to obtain a temporal merging candidate. The merging candidates have been illustrated in FIG. 6.

The decoding apparatus derives an available temporal motion vector predictor (MVP) value using the derived reference picture index.

When a number of candidates (NumMergeCand) on the merging candidate list (MergeCandList) is 1, the decoding apparatus may set a merge index (Merge_Idx) equal to 1. Otherwise, the decoding apparatus may set the merge index equal to an index value received from the encoding apparatus.

The decoding apparatus may derive a motion vector (mvLX) of a merging candidate indicated by the merge index and the reference picture index (refIdxLX), and perform motion compensation using the derived motion vector and reference picture index.

When the AMVP mode is applied, the decoding apparatus may derive a reference picture index (refIdxLX) of the current block (for example, prediction unit).

The decoding apparatus may derive a motion vector predictor (MVP) value using the reference picture index.

To this end, the decoding apparatus may derive spatial motion vector (MVP) candidates from the blocks (for example, prediction units) neighboring to the current block. The decoding apparatus may also derive a temporal motion vector predictor (MVP) of a collocated block indicated by the reference picture index. The decoding apparatus may construct an MVP list (mvpListLX). Here, motion vectors may have priories in order of ② a motion vector of a temporal collocated block (mvLXCol), for example, the temporal collocated block may be one of the corresponding blocks C0, C3, BR and H of FIG. 6, ② motion vectors of neighboring blocks in the left side of the current block (mvLXA) and ③ motion vectors of neighboring blocks in the upper side of the current block (mvLXB) among available vectors.

When a plurality of motion vectors has the same value, the decoding apparatus may remove motion vectors other than a motion vector having a highest priority among the motion vectors having the same value from the MVP list.

When a number (NumMVPCand(LX)) of MVP candidates on the MVP list is 1, the decoding apparatus may set mvpIdx equal to 1. When the number of MVP candidates is 2 or more, the decoding apparatus may set mvpIdx equal to an index value received from the encoding apparatus. The decoding apparatus allocates a motion vector indicated by mvpIdx among the MVP candidates on mvpListLX as the motion vector predictor value mvpLX.

The decoding apparatus may derive a motion vector for the current block using Equation 4.

$$mvLX[0]=mvdLX[0]+mvpLX[0]$$

$$mvLX[1]=mvdLX[1]+mvpLX[1] \quad \text{[Equation 4]}$$

In Equation 4, mvLX[0] is an x component of the motion vector for the current block, mvdLX[0] is an x component of a motion vector differential value for the current block, and mvpLX[0] is an x component of the motion vector predictor value for the current block. mvLX[1] is a y component of the motion vector for the current block, mvdLX[1] is a y component of the motion vector differential value for the current block, and mvpLX[1] is a y component of the motion vector predictor value for the current block.

Meanwhile, when intra prediction is applied, the decoding apparatus may generate a predicted block for the current block based on neighboring samples using an intra prediction mode for the current block.

The decoding apparatus may generate the reconstructed signal for the current block (S740). When inter prediction is applied, the decoding apparatus may generate the predicted block using the derived motion vector and add the predicted block and the residual block to reconstruct the current block. When intra prediction is applied, the decoding apparatus also may add the predicted block and the residual block to reconstruct the current block as described.

Although methods have been described with a series of stages or blocks based on the flowcharts in the aforementioned embodiments, the present invention is not limited to the foregoing sequence of the stages. Some stages may be carried out in different order from described above or at the same time. Further, the aforementioned embodiments include examples of various aspects. For instance, the illustrated embodiments may be achieved in diverse combinations within the scope of the present invention. It will be appreciated by those skilled in the art that changes, modifications and alternatives may be made in these exemplary embodiments without departing from the principles and spirit of be the invention, the scope of which is defined in the appended claims and their equivalents.

The invention claimed is:

1. A method of decoding a video signal having a current block to be decoded with a decoding apparatus, comprising:
    obtaining residual coefficients relating to the current block from the video signal;
    obtaining inverse-quantized residual coefficients by inverse-quantizing the residual coefficients;
    determining, based on transform skip mode information specifying a transform skip mode of the current block, the transform skip mode of the current block among transform skip mode candidates,
    wherein the transform skip mode candidates include at least one of a 2-dimensional transform mode, a horizontal transform mode, a vertical transform mode and a non-transform mode, and
    wherein a number of the transform skip mode candidates available to be selected as the transform skip mode of the current block is different based on a partition size of the current block, the current block being a 2N×2N or a N×N partition of a coding block;
    obtaining, based on the determined transform skip mode, residual samples by selectively performing an inverse-transform for the inverse-quantized residual coefficients of the current block;
    obtaining prediction samples of the current block;
    decoding the current block by using the residual samples and the prediction samples; and
    applying a deblocking filter to the decoded current block,
    wherein when the inverse-transform is performed for the current block, the obtaining of the residual samples comprises:
        determining, based on a prediction mode relating to the current block and a size of the current block, whether a transform type of the current block is a discrete cosine transform (DCT) or a discrete sine transform (DST), the prediction mode of the current block being inter prediction or intra prediction; and
        performing the inverse-transform for the inverse-quantized coefficients of the current block by using the determined transform type,
    wherein when the non-transform mode is determined to be the transform skip mode of the current block, the residual sample is obtained by scaling the inverse-quantized residual coefficient with a pre-determined value,
    wherein the inverse-transform is performed by using one of the discrete cosine transform (DCT) and the discrete sine transform (DST), and
    wherein the discrete sine transform (DST) is used when the prediction method is intra prediction and the size of the current block is a 4×4 block.

2. The method of claim 1, wherein the transform skip mode information is obtained based on a size of a transform unit of the current block.

3. The method of claim 1, wherein when the prediction samples are obtained using intra prediction, the coding block is partitioned into plural prediction blocks for the intra prediction only if the coding block is a minimum coding block.

4. The method of claim 3, wherein the intra prediction is performed on a transform block basis when a size of a prediction block is different from a size of a transform block.

5. The method of claim 1, wherein when the prediction samples are obtained using intra prediction, the method further comprises:
    obtaining reference samples of a current block based on neighboring samples adjacent to the current block; and
    determining whether to apply a smoothing filter to the reference samples based on an intra prediction mode of the current block.

6. The method of claim 5, wherein when the smoothing filter is applied to the reference samples, one of a plurality of smoothing filters is selected based on a filter information signaled from the video signal.

* * * * *